United States Patent [19]

Haapala

[11] 4,074,656
[45] Feb. 21, 1978

[54] CAKE DECORATOR'S TURNTABLE

[76] Inventor: Ray Haapala, Rte. 3, Box 76, Dassel, Minn. 55325

[21] Appl. No.: 725,647

[22] Filed: Sept. 22, 1976

[51] Int. Cl.² .............................................. B05C 11/14
[52] U.S. Cl. ....................................... 118/502; 108/1; 248/397; 248/398
[58] Field of Search ............... 108/1, 4, 142; 118/13, 118/500, 502; 248/393, 397, 398; 269/289 R, 321 W

[56] References Cited

U.S. PATENT DOCUMENTS

| 645,517 | 3/1900 | Sievert | 118/500 X |
|---|---|---|---|
| 2,473,407 | 1/1949 | Adams | 118/50 D |
| 2,708,899 | 5/1955 | Rudolph | 118/50 D |
| 3,420,210 | 1/1969 | Lindquist | 118/500 X |
| 3,633,540 | 1/1972 | Bolt et al. | 118/502 |

*Primary Examiner*—James C. Mitchell
*Attorney, Agent, or Firm*—Littlepage, Quaintance, Murphy, Richardson & Webner

[57] ABSTRACT

A turntable for supporting a cake is supported on an axis which can be tipped so as to facilitate the application of decoration to the side of a cake.

4 Claims, 4 Drawing Figures

CAKE DECORATOR'S TURNTABLE

FIELD OF THE INVENTION

Coating Apparatus, Edible Base or Coating Type.

OBJECTS

When decorating fancy cakes, designs are applied onto the icing not only to the top, but also around the sides of the cake. They may be garlands, flowers, or the like made of colored sugar bases, and they may be extruded through a shaped nozzle, or they may be formed from string-like material which is draped upon the cake. Since the sides of the cake are normally vertical, it is ordinarily difficult to apply the design material. The object of this invention is to provide a turntable upon which the cake may be rested, and which can be tipped over at an angle so that, as the cake is rotated on the turntable, part of the cake side will be upwardly exposed so that the decorative material may be applied downwardly, rather than sidewise.

Further objects are the provision of means for clamping the turntable support in desired position, vertical or tipped, means for predetermining the extent to which the turntable axis can be tipped, and an axial spike on the turntable to prevent the cake from sliding off when it is tipped.

These and other objects will be apparent from the following specification and drawing, in which.

Figure 4:
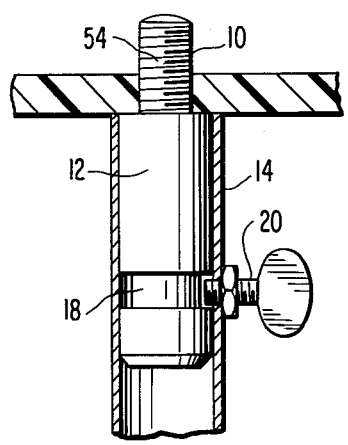
Figure 3:
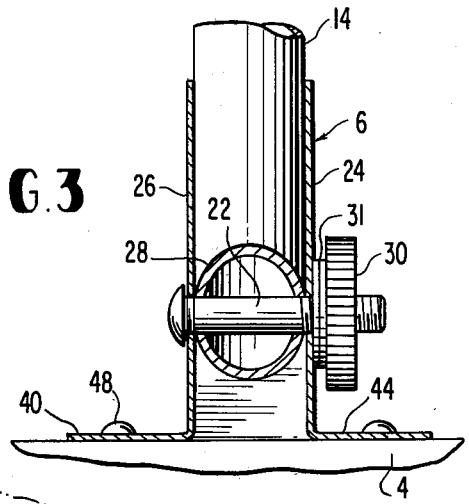
FIG. 3 is a fragmentary cross section along the line 3—3 of FIG. 2 showing the tip pivot and the brake for restraining the tipping action; and, FIG. 4 is a fragmentary cross section along the line 4—4 of FIG. 2 showing the spike and the brake for restraining the turntable against free rotation.

Referring now to the drawings in which like reference numerals denote similar elements, the cake turntable 2 is supported on base 4 by a chassis 6, the turntable being comprised of a flat disc 8 which may be formed of transparent plastic material, as shown. Projecting upwardly from the center of disc 8 is a spike 10 on the end of a shaft 12 which rotatably supports the disc 8, the shaft being rotatable in the hollow end of arm 14 of a crank 16. As detailed in FIG. 4, the shaft 12 has an annular groove 18 into which the end of a set screw 20 engages. This not only prevents the shaft 12 from being dislodged from the end of crank arm 14; but also serves as a brake, which, when tightened, restrains the rotative movement of the shaft 12 upon which disc 8 is affixed. A pivot bolt 22 extends between casing sides 24 and 26 and through the bend of the crank, and a clamp nut 30 on pivot bolt 22 may be turned so as to force washers 31 against the casing and squeeze the sides 24 and 26 thereof and thereby restrain the crank arm 14 against tipping movement.

A plug 32 in the other crank arm 34 supports a screw 36 which extends outwardly through a slot 38 in the chassis end wall 40 and a nut 42 threaded on screw 36 predetermines the extent to which the turntable can be tipped. The opposite sides of casing 6 have flanges 44, 46 which are secured against base 4 by screws 48.

Figure 1:
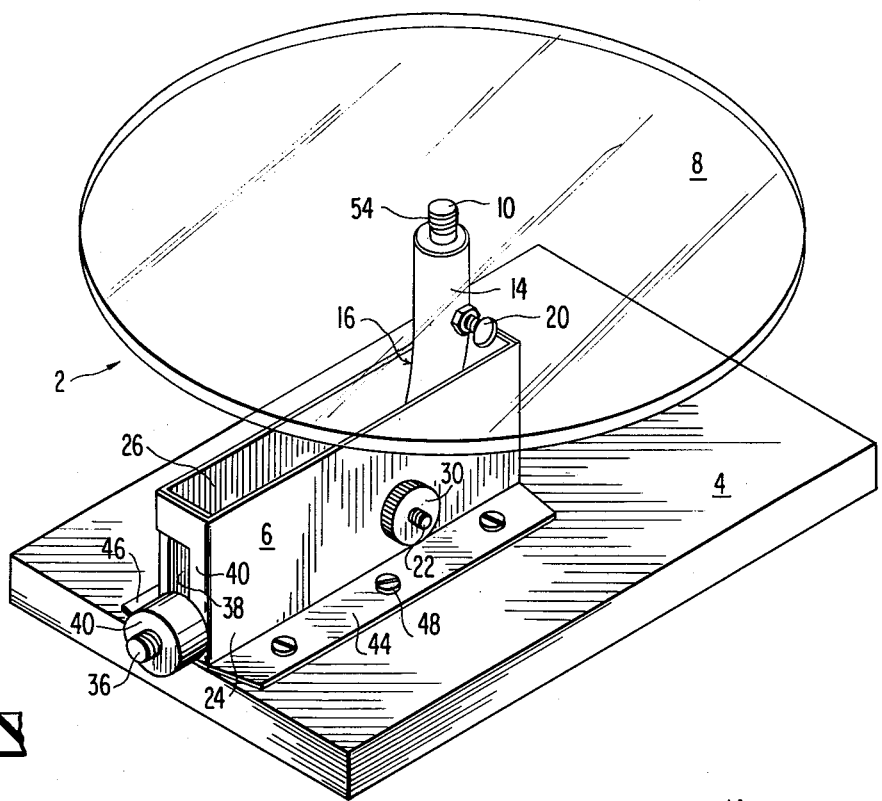
FIG. 1 is a perspective view of the turntable with its axis upright.
Figure 2:
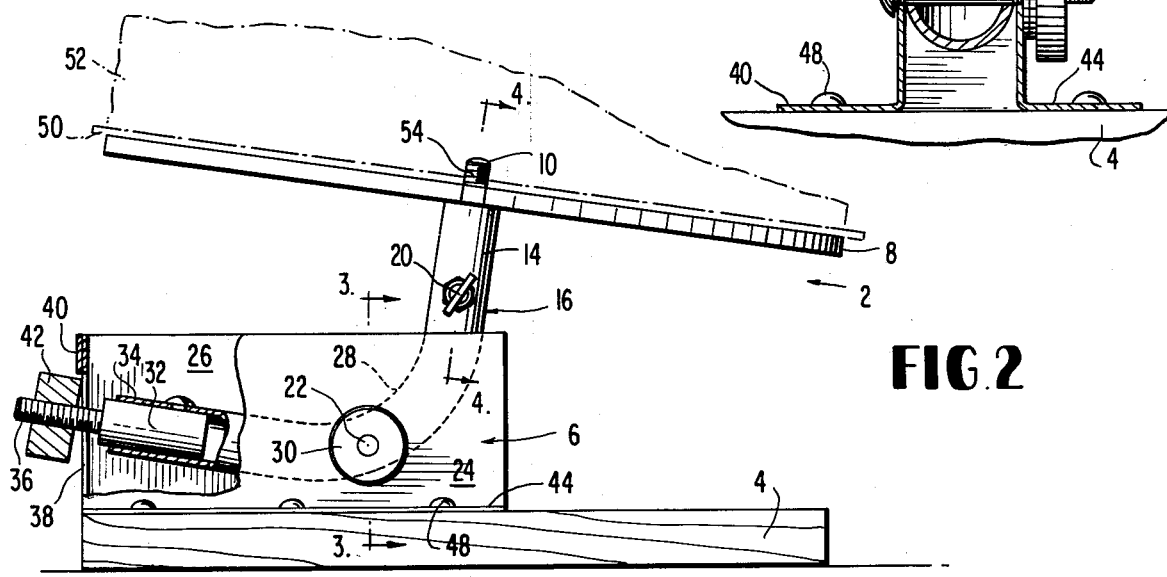
FIG. 2 is a side elevation, partly broken away, of the turntable with its axis tipped.

In operation, a pallet 50 with a cake 52 thereon is set down upon spike 10, the screw threads 54 on the spike frictionally engaging through a central hole in the pallet so as to provide a good friction fit. The free end of the spike 10 pierces the center of the cake to keep it from sliding off when the cake is tipped over to its FIG. 2 position. If the top of the cake is to be decorated first, the turntable is disposed in its FIG. 1 position and so as to present a near side of the cake top to the decorator as the turntable is rotated. When the side of the cake is to be decorated, set screw 20 is tightened to the desired degree to prevent the disc 8 from spinning freely, nut 30 is loosened sufficiently to permit the crank 16 to be swung to its FIG. 2 position by grasping nut 42 and swinging arm 34 upwardly. The extent of the swing is predetermined by the adjustment of nut 42, and the garlands or other decorations are applied to the high side of the cake as the latter is rotated on the turntable. After the side of the case has been decorated, the turntable may be tipped back to its FIG. 1 position by swinging crank arm 34 downwardly so that the cake pallet with the cake on it, can be lifted off vertically.

I claim:

1. A base
a chassis on said base,
a rigid crank having two arms extending from a juncture thereof at substantially right angles to one another,
pivot means supporting the juncture of the crank arms on said chassis for rotation about a horizontal pivotal axis wherein one of said crank arms extends generally upwardly from said pivot means and the other arm extends generally laterally from said pivot means,
a normally horizontal disc-shape platform having a central spike projecting upwardly therefrom, bearing means rotatably mounting said platform on the free end of said one arm for rotation about the longitudinal axis of said one arm, and manually engageable means on the free end of said other arm, whereby said crank may be swung about said horizontal axis so as to tip said platform from the horizontal.

2. The combination claimed in claim 1, and manually operable means for adjustably restraining said crank arm against rotation about said pivotal axis.

3. The combination claimed in claim 1, and manually operable means for adjustably restraining said platform against rotation about the longitudinal axis of said one arm.

4. The combination claimed in claim 1, the manually engageable means on the free end of said other arm including means for adjustably limiting the swinging movement of said extent of crank.

* * * * *